June 13, 1933.   H. HOLZWARTH   1,914,340
HYDRAULICALLY CONTROLLED TRANSFER VALVE
Filed Aug. 7, 1930   3 Sheets-Sheet 3

Inventor
Hans Holzwarth
By Joseph Hirschman
Attorney

Patented June 13, 1933

1,914,340

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

HYDRAULICALLY CONTROLLED TRANSFER VALVE

Application filed August 7, 1930, Serial No. 473,736, and in Germany August 22, 1929.

My invention relates to hydraulically controlled transfer or nozzle valves of the poppet type designed to control the discharge of combustion gases from an explosion chamber.

It is an object of the present invention to provide a valve of this type wherein the liquid, such as oil, employed to operate the valve serves at the same time to cool the portion of the valve exposed to the hot combustion gases. It is also an object of the invention to provide a valve of the kind specified which is simple in construction and thoroughly reliable in operation.

On the accompanying drawings are shown by way of example two embodiments of the invention. In said drawings:

Fig. 4 is a fragmentary sectional view showing a modification.

Figure 2:
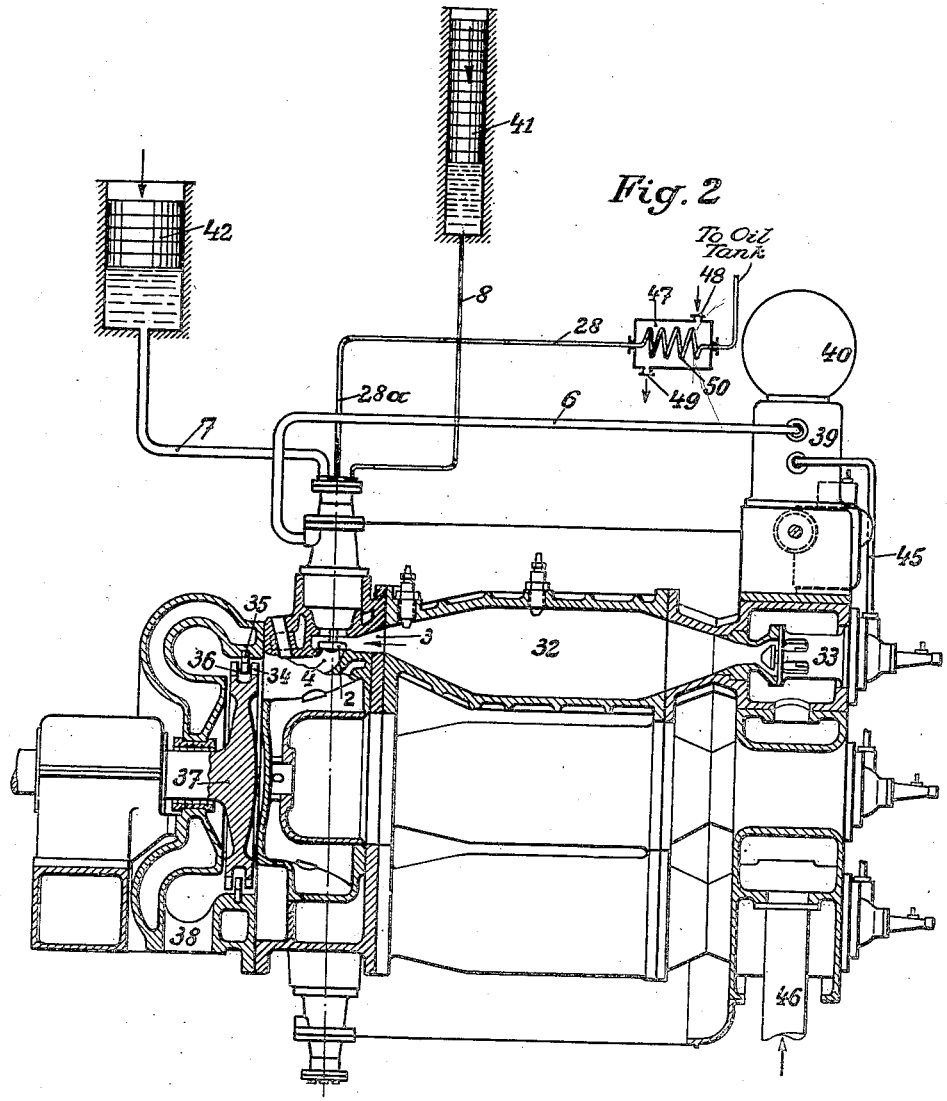
Fig. 2 is a diagrammatic view, partly in section, of an explosion turbine plant having my improved valve embodied therein.

Referring to the drawings, the numeral 1 indicates a hollow casing which receives the stem of a poppet valve 2 arranged to control the communication between the outlet end 3 of an explosion chamber and the channel 4 which leads to the gas nozzle. A control piston 5 is rigidly mounted on the valve stem and is operated upon by a pressure fluid to determine the position of the valve head at any instant. To this end I provide ports 6, 7 and 8 for a pressure fluid, such as oil under pressure. Through port 6 I alternatingly charge oil at a pressure of about 7 atm. and discharge the same at predetermined instants controlled, for example, by means of a distributor 39 which may be of the type described in my United States Patent No. 877,194. The port 7, on the other hand, receives continuously oil under a constant pressure of about 2 to 3 atm. and, as shown in Fig. 2, may be in constant communication with an oil accumulator wherein the oil is maintained under pressure by means of a weight 42. The port 8 is in constant communication with an accumulator 41 from which it receives oil under a pressure of about 30 atm.

The poppet valve 2 is operated as follows: As soon as port 6 is placed in communication with the source of oil under 7 atm. pressure by the distributor, the pressure of the oil entering through port 7 and acting on the upper surface 9 of an annular slide valve member 10 is overcome by the higher pressure of the oil entering space 11 and groove 12 and below such slide valve, whereupon the latter is moved upwardly. As a result, the communication between port 8 and space 15 above the piston 5, normally effected by a groove 14 in the slide valve 10, is interrupted, so that the feed of oil at 30 atm. pressure ceases. At the same time the high pressure oil in space 15 is caused to discharge into the space fed by port 7 through groove 16 in the slide valve 10. The oil under 7 atm. pressure in the space 11 acting against the under surface 17 of the piston 5 now thus has only the oil of about 2 atm. pressure acting against it on the upper surface 18 of the piston, and therefore raises the piston 5 and thereby lifts the poppet valve 2 from its seat 19, so that the explosion gases discharge from the explosion chamber 3 into the channel 4. In its fully open position, the head of the valve is received within a recess 20 in the machine frame, so that the path of the gases is unobstructed and, throttling is prevented. As soon as space 11 is exhausted by the distributor (by placing the port 6 in communication with an oil exhaust chamber under atmospheric pressure), the pressure of the oil entering at 7 preponderates and moves the slide valve 10 downwardly to the position shown in Fig. 1. Space 15 is thus disconnected from port 7 and is placed in communication with port 8 through groove 14. Under the influence of the high pressure oil entering at 8, the valve 2 is rapidly closed.

According to the present invention, the oil of medium pressure (7 atm.) alternately changed and discharged through port 6 is first made to pass through the space 21 of the hollow casing 1 whereby the valve stem is kept unaffected by the temperature of the machine frame 31 or of the explosion gases. According to a further development of the inventive idea, a portion of the oil in space 11 is caused to flow through a port 22 into a longitudinal bore 23 in the valve stem and thus further cool such hollow stem. The cooling oil flows to the bottom of the valve and into the head 2. The valve head includes, in addition to the main portion 2, a separate bottom member 24 which is welded to the portion 2, as shown at 25. Before attaching the member 24, an intermediate wall or partition 27 provided with holes 26 at its edge is inserted. In the embodiment of the invention illustrated in Fig. 1, this partition is in the form of a spring plate which is held in its central position by means of a return conduct 28 which is fixed to the bottom member 24. After the cooling oil has traversed the space 29 above the intermediate wall 27, it passes through the holes 26 into the space 30 between such wall and the bottom member or plate 24 and then into conduit 28 from the top of which it is withdrawn in any suitable manner. The head of the poppet valve is thus cooled by means of the operation of pressure oil, so that the need for special cooling apparatus is eliminated.

Figure 1:
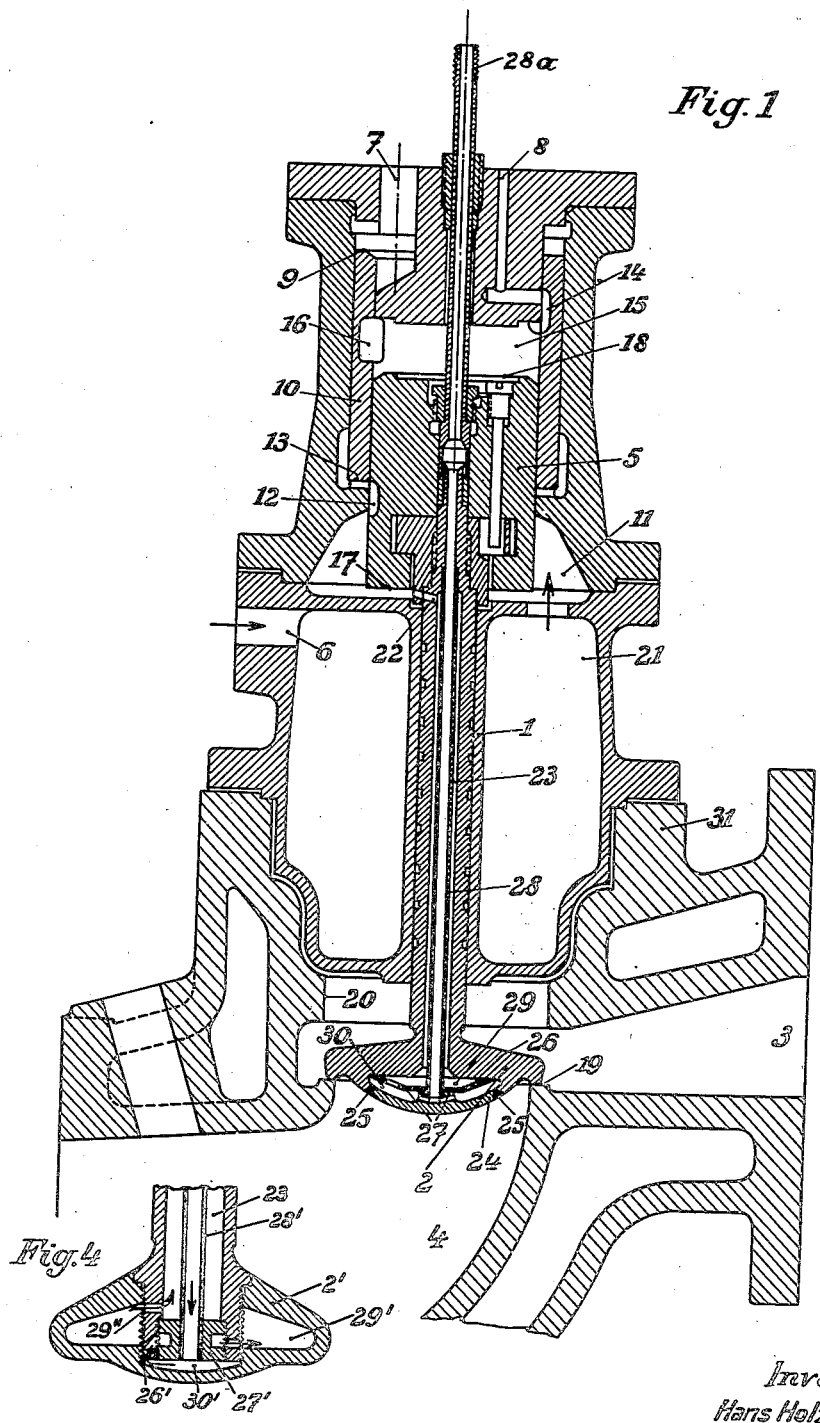
Fig. 1 shows a central vertical section through a valve constructed in accordance with the invention.

If desired, the conduit 28 may be provided with a throttling device, such as an adjustable screw, to control the amount of oil flowing into the valve head. One suitable device for accomplishing such result is shown in Fig. 1 wherein the upper end of the conduit 28 is provided with a throttling screw 51 provided with a finger wheel 52. The end of 53 of the screw may be adjusted relatively to the mouth of the bore 54 by rotating the screw, the flow of oil into the conduit 28a being thereby regulated.

In the form of the invention shown in Fig. 4, the cooling operating oil flows down into the hollow valve head through a conduit 28' positioned within a longitudinal bore 23' in the valve stem. The lower end of the conduit 28' is supported by a threaded member 27' which is screwed into the threaded end of the valve stem. The hollow valve head 2' is completely separate from the stem and is in screw-threaded engagement therewith. The cool oil flowing down the conduit 28' first enters the space 30' and then passes through port 26' into an annular space within the member 27', after which it enters the space 29'. The oil leaves space 29' through opening 29'' and is discharged through bore 23.

Figure 3:
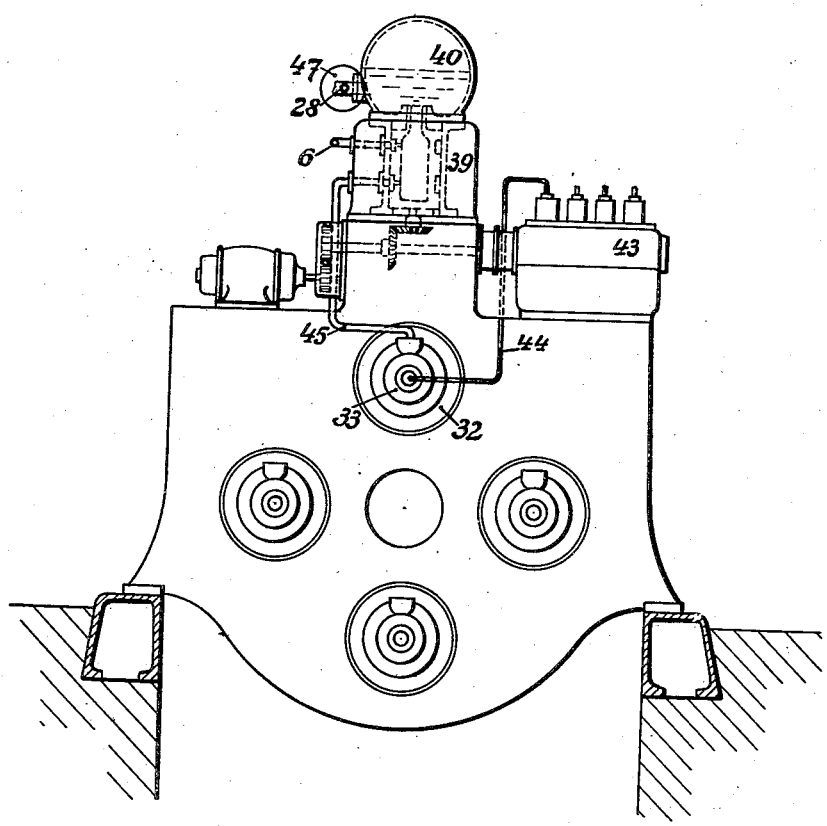
Fig. 3 is an end view of the apparatus shown in Fig. 2.

Figs. 2, 3 illustrate diagrammatically a turbine plant having four explosion chambers 32 provided with inlet valves 33 which are fed with air by a conduit 46 and with fuel by conduit 44 controlled from a fuel pump 43 (Fig. 3). The valves 33 are hydraulically controlled through pipes 45 from the distributor 39. The gases generated in the explosion chambers are charged against the blades 34 of a rotor 37, and after being reversed by the stationary blades 35 they act against the second set of rotor blades 36, after which they pass into the exhaust space 38. The heated cooling oil may be passed through a coil 50 of a heat exchanger 47 where it may preheat water entering at 48 and leaving at 49, or generate steam which may then be employed to drive a turbine. The cooled oil is collected in an oil supply tank whence it is pumped to an accumulator or air chamber 40 communicating with the interior of the distributor 39 from which it is again charged to the valves to operate the latter.

It will be understood that the oil exhausting from the distributor is likewise returned to the pressure space at the interior thereof by a suitable pump, as shown in my above mentioned Patent No. 877,194, such exhausting oil and also the cooled cooling oil being directed, if desired, to the same supply tank, from which the oil is sucked by the pump.

I claim:

1. In combination, a poppet transfer valve for explosion chambers comprising a hollow stem, a hollow head attached to said stem, said stem reaching to the bottom of said head, a conduit in said stem, a member within said stem for anchoring the bottom end of said conduit, the latter discharging into the space between said member and the bottom of the valve head, said stem being provided with a port connecting said space with the space in the valve head about said stem, means for operating said valve hydraulically at predetermined instants, and means whereby a portion of the operating oil is charged into said conduit.

2. In combination, a poppet transfer valve for explosion chambers comprising a stem and a hollow head, a perforated partition dividing the space in said head into two parts, said stem being hollow and provided with a conduit therein, said stem and conduit each communicating directly with one of the spaces in said valve head, means for operating said valve hydraulically, and means whereby a portion of the operating liquid is conducted into said conduit to cool the valve.

3. In combination, a poppet transfer valve for explosion chambers comprising a stem and a hollow head, a perforated partition dividing the space in said head into two parts, means for operating said valve hydraulically, and means whereby a portion of the operating liquid is conducted into one of the spaces in said valve head and withdrawn from the other.

4. In combination, a poppet transfer valve adapted to control the discharge of combustion gases from an explosion chamber, means for operating said valve hydraulically with pressure liquid at predetermined instants, and means for conducting a portion of the operating pressure liquid in contact with parts of the valve arranged in the immediate vicinity of the path of combustion gases discharged by the valve to cool such parts.

5. In combination, a poppet transfer valve adapted to control the discharge of combustion gases from an explosion chamber including a stem, a hollow casing about said stem and extending to substantially the lowermost portion of the latter adjacent to the path of flow of combustion gases discharged by said valve, means for operating said valve hydraulically with pressure oil at predetermined instants, and a conduit for conducting a portion of the operating oil into said casing to cool said stem.

6. In combination, a poppet transfer valve adapted to control the discharge of combustion gases from an explosion chamber and composed of a relatively narrow stem and an enlarged head; means for operating said valve hydraulically comprising a fluid circuit including a source of pressure fluid and a pressure fluid conduit, a piston associated with said valve and arranged in receiving relation to said conduit, and a distributor associated with said conduit and operative to control the flow of pressure fluid therethrough; said valve provided with cooling spaces at the portion thereof directly exposed to the combustion gases discharged by such valve, a conduit for conducting part of the pressure fluid into said cooling spaces, and a conduit for returning the heated fluid to the fluid circuit.

7. In combination, a poppet transfer valve adapted to control the discharge of combustion gases from an explosion chamber and composed of a relatively narrow hollow stem and an enlarged hollow head whose interior communicates with the interior of such stem; means for operating said valve hydraulically comprising a fluid circuit including a source of pressure fluid and a pressure fluid conduit, a piston associated with said valve and arranged in receiving relation to said conduit, and a distributor associated with said conduit and operative to control the flow of pressure fluid therethrough; and means for diverting a part of the pressure fluid from the pressure fluid circuit into the valve head to cool the latter, comprising a tube positioned within said stem in spaced relation to the inner walls of the latter and leading into the space within the valve head, a conduit communicating with the source of pressure fluid and leading into the space between the tube and stem, and a conduit connected with the end of the tube remote from the valve head and communicating with a low pressure section of the fluid circuit for returning the heated fluid to the latter.

HANS HOLZWARTH.